United States Patent [19]
Fendrich, Jr.

[11] 3,889,177
[45] June 10, 1975

[54] POWER SUPPLY HAVING SUBSTANTIALLY CONSTANT OUTPUT DURING LOAD SWITCHING

[75] Inventor: Charles Nelson Fendrich, Jr., Elizabethtown, Pa.

[73] Assignee: AMP Incorporated, Harrisburg, Pa.

[22] Filed: Sept. 24, 1973

[21] Appl. No.: 400,436

Related U.S. Application Data

[63] Continuation of Ser. No. 264,090, June 15, 1972, abandoned.

[52] U.S. Cl. .................... 323/17; 321/2; 321/14; 321/19; 323/20; 323/25; 323/DIG. 1
[51] Int. Cl. ........................................ H02m 7/20
[58] Field of Search ....... 321/2, 4, 14, 18, 19, 27 R; 323/17, 19, 20, 22 T, 22 SC, 23, 25, DIG. 1

[56] References Cited
UNITED STATES PATENTS

| | | | |
|---|---|---|---|
| 3,284,692 | 11/1966 | Gautherin | 323/DIG. 1 |
| 3,353,080 | 11/1967 | Santelmann | 321/2 |
| 3,377,546 | 4/1968 | Schott | 323/DIG. 1 |
| 3,515,974 | 6/1970 | Stich | 321/2 |
| 3,551,777 | 12/1970 | Bingley | 321/2 |
| 3,564,388 | 2/1971 | Nolf | 321/18 |
| 3,567,996 | 3/1971 | Gordon et al. | 321/2 X |
| 3,670,234 | 6/1972 | Joyce | 321/2 X |

*Primary Examiner*—A. D. Pellinen
*Attorney, Agent, or Firm*—Gerald K. Kita

[57] ABSTRACT

A power supply capable of maintaining substantially constant output when switching from no load to full load condition using a set of series capacitors which provide the required output voltage during switching.

6 Claims, 6 Drawing Figures

PRE-REGULATOR

CONVERTER 35

1.67 KV D.C. 41

POWER SUPPLY HAVING SUBSTANTIALLY CONSTANT OUTPUT DURING LOAD SWITCHING

This is a continuation of application Ser. No. 264,090 filed June 15, 1972 now abandoned for Power Supply.

This invention relates to a power supply and, more specifically, to a power supply capable of maintaining substantially constant output voltage when switching from no load to full load conditions or full load to no load conditions.

Power supplies capable of converting low voltage signals to higher voltage with a power output in the kilowatt range have been known in the prior art. However, these power supplies have been inherently plagued with the problem of being unable to maintain a relatively constant output voltage when switching quickly from a no load to a full load condition or from a full load to a no load condition. In accordance with the present invention there is provided a power supply capable of maintaining a substantially constant output voltage when switching from no load to full load or from full load to no load.

Briefly, the above is accomplished by utilizing a parallel-series converter wherein a regulated input voltage is fed in parallel to plural converters, each converter increasing the output voltage therefrom, the outputs of the converters being added in series in a set of capacitors. An auxiliary power supply maintains a predetermined voltage across the capacitors during no load conditions when the converter is shut off, thereby providing the desired predetermined output voltage when switching to the full load condition. There is also provided a duty cycle control which is responsive to output voltage and raw input voltage to control the value of the output voltage at all times in substantially instantaneous manner.

It is therefore an object of this invention to provide a power supply which maintains substantially constant output voltage when switching from a no load to full load condition or from a full load to no load condition.

It is a further object of this invention to provide a power supply controlled by a duty cycle control circuit responsive to both raw input voltage and output voltage concurrently.

It is a yet further object of this invention to provide a power supply which converts regulated input voltage in plural parallel converters and places the output of said converters in series.

The above objects and still further objects of the invention will immediately become apparent to those skilled in the art, after consideration of the following preferred embodiment thereof, which is provided by way of example and not by way of limitation, wherein:

FIGS. 1A and 1B form a block diagram of the power supply in accordance with the present invention, FIG. 2 is a block diagram of the contents of the duty cycle control circuit of FIG. 1; and FIG. 3A is a circuit diagram of the preregulator 7 of FIG. 1A;

Figure 1A:
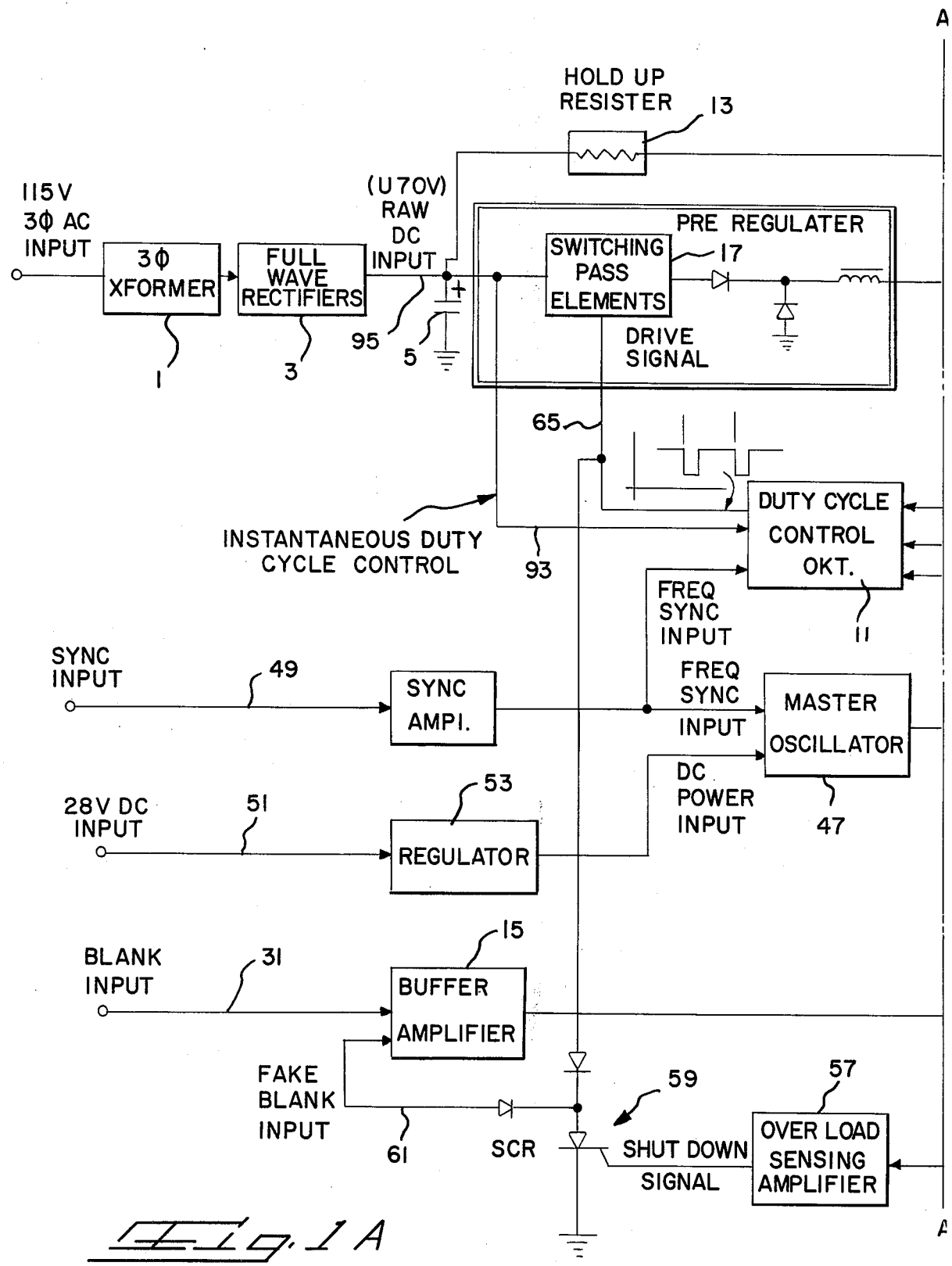

Referring to FIG. 1A, there is shown a 115 volt 3 phase AC input which goes through a 3 phase transformer 1 to provide unregulated AC voltages of about 50 volts. This unregulated voltage goes through full wave rectifiers 3 to provide an output of about unregulated 70 volts DC. This unregulated voltage is filtered by a large value filter capacitor 5. The voltage is then fed to a preregulator which converts the unregulated 70 volts to a regulated voltage of about 55 volts.

An input from output 9 is fed to the duty cycle control circuit 11 and provides a drive signal to control the switching pass elements of the preregulator as explained in more detail hereinbelow. The preregulator therefore regulates the level of the 55 volts which is later boosted up to 5 kv. Therefore, if the output of the preregulator is increased by about 1 percent, the output 9 will be pushed up by 1 percent.

The hold up resistor 13, in conjunction with other circuitry, is used to improve the response in going from full load to no load at the output 9. It is necessary to hold the output 9 to a relatively constant voltage on taking output current therefrom and turning the current on and off. Normally in going from full load to no load as in the present high wattage circuit, the voltage suddenly jump up and when the load is applied again, the voltage tends to jump down. Depending on the time response of the circuitry, this can cause oscillation or ringing. It is desired to hold this type of action to a minimum. The circuitry is therefore aimed at accomplishing this end. Basically, this is done by running at full load which is 5 kv and 200 ma and then suddenly going to no load. When this is done, a logic type signal is obtained at the blank input 31 and advises that the circuit has gone to no load. The signal goes through a buffer amplifier 15 and provides a gating signal to the duty cycle control circuit 11 to shut down the preregulator via the switching pass element 17. This causes the capacitor 19 to no longer take in charge. At the same time, when the preregulator is turned off, the parallel-series converter 21 is also turned off via the transistor switch 23 and stops converting at the same time. Therefore capacitor 19 remains charged up to its full load level because current is no longer being drawn from it or added to it. Also, by the same reasoning, the output filter capacitors 25, 27 and 29 from the high voltage section will stay charged for the reasons that no current is being put into them and no current is being taken out. When a load such as 200 ma is applied again, the blank input 31 provides a signal that an output is required and the preregulator and the series-parallel converter 21 again provide current. In this way, the voltages remain as close to 5 kv as possible when a load is applied.

Figure 3A:
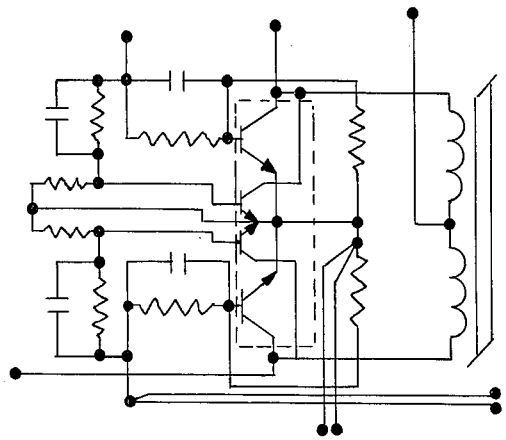
FIG. 3B is a circuit diagram of the converter 35 of FIG. 1B.
FIG. 3C is a circuit diagram of 1.67 KV DC unit 41 of FIG. 1B.
Figure 3B:
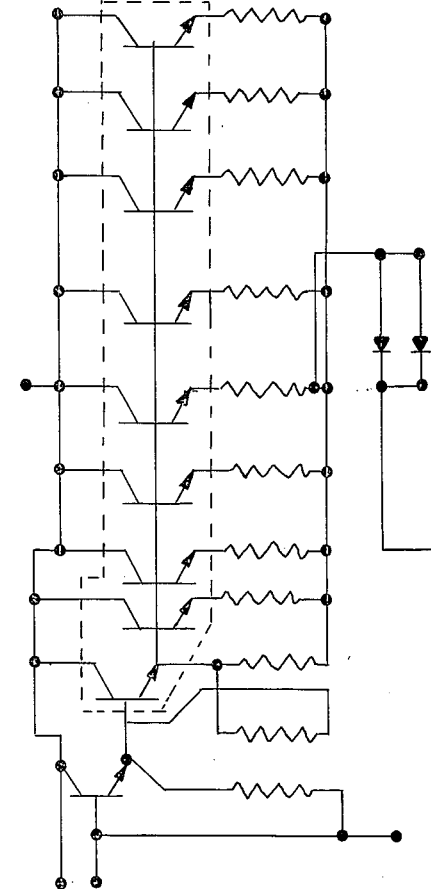
Figure 3B:
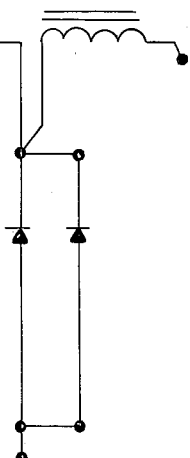
Figure 3C:
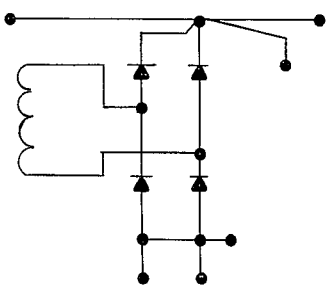

A unique feature of the invention is the manner of converting in converter 21. There are actually three separate power handling channels which are broken up into a parallel-series power combination. The low voltage or input side 33 is taken from the 55 volt regulated DC and goes into three converters 35, 37 and 39 which are push pull transistor converters working into a transformer as shown in FIG. 3B. The output of the transformer of each is AC and becomes rectified in rectifiers 41, 43 and 45 as shown in FIG. 3C to provide 1.67 Kv DC for each rectifier output. These outputs are added and filtered by capacitors 25, 27 and 29 to provide the 5 kv output. Therefore, the input 33 is taken in parallel and the outputs are added in series. This makes for an efficient operation. This is because each converter channel has a turns ratio transformer of roughly 1.7 kv to 55 volts rather than the full 5 kv to 55 volts. The efficiency of a converter is related to the turns ratio due to reflected capacitance from output to input causing higher currents and other problems. The converter is driven by a master oscillator 47 via switch 23 and is not free running. The three channels are driven synchronously.

The master oscillator 47 is a free running oscillator. There is a sync input 49 to the master oscillator which will cause the oscillator 47 to oscillate at a frequency somewhat higher than it will without the sync signal. The purpose of this sync signal is to synchronize the master oscillator 47 to a certain frequency as will be described later. The sync input 49 comes from the outside. The master oscillator 47 provides a square wave voltage which is applied to the transistor switch 23 which drives the converter 21. The 28 volt DC input 51 is fed to a regulator 53 and provides the power to drive the master oscillator 47.

The transistor switch 23 is part of the blanking function previously discussed and is either in the open or closed state. When it is in the closed state, the drive from the master oscillator is being delivered to the converters 35, 37 and 39 and provides the normal operation. When the transistor switch 23 opens, there is no longer drive to the parallel-series converter 21. This shuts down the parallel-series converter and is controlled by the blanking input 31 which provides the gating signal thereto.

Over loads are sensed at the resistor 53 between the elements 41, 43, 45 and ground and provide an overload voltage signal which is applied along line 55 to an overload sensing amplifier 57. When an overload signal is sensed by the overload sensing amplifier, it provides a signal to an SCR 59 and removes the drive signal going to the switching pass element 17 from circuit 11 by pulling to ground. It also provides a so called fake blank input along line 61, which is a blank signal at the buffer amplifier 15, thereby providing a shut down of the parallel-series converter 21 as well as operating the duty cycle control circuit 11 to provide an extra shut down of the switching pass elements 17. The purpose for having two signals going to the switching pass elements 17 is to provide immediate shut down response rather than a response required by going through the buffer amplifier 15 and other elements.

There is an over voltage input 63 to the duty cycle control circuit from the input 33. This operation will be explained later.

The output of the duty cycle control circuit 11 is a drive signal on line which is a square wave which has a certain ratio of on to on plus off time, this being the duty cycle. This ratio is variable. The duty cycle will determine and control the output voltage. The duty cycle drive signal merely turns the switching pass elements 17 full on or full off. An increase in the duty cycle will increase the output of the preregulator whereas a decrease in the duty cycle will decrease the voltage at the output of the preregulator.

The flea power 5 kv power supply 67 is a small power supply which has the sole function of maintaining a 5 kv voltage across capacitors 25, 27 and 29 in the blank input mode (no load current) thereby replacing the power which is drawn through the sensing string resistor 69 at this time. Therefore, since the sum of currents to and from the output 9 is zero, at this time, the 5 kv output will remain constant. The hold up resistor 13 has a similar function at the output of the preregulator 7. The capacitor 19 does have some slight load on it to drive the flea power supply 67 and the duty cycle control circuit 11. Therefore the capacitor 19 can discharge slowly, and the signal from the raw DC input through the hold up resistor 13 will replace this current at capacitor 19. Hence the voltage on the 55V capacitor will remain at a constant level during this time (during blanking).

The sensing string resistor 69 is the determining factor on what the output of the duty cycle control circuit 11 will be. If the 5 kv output 9 goes low, the sensing string 69 will apply on a voltage on the output voltage sensing input 71 which indicates that the output voltage is low and applies this signal to the duty cycle control circuit 11. Now the duty cycle must increase to return the 5 kv output to its proper level.

Figure 2:
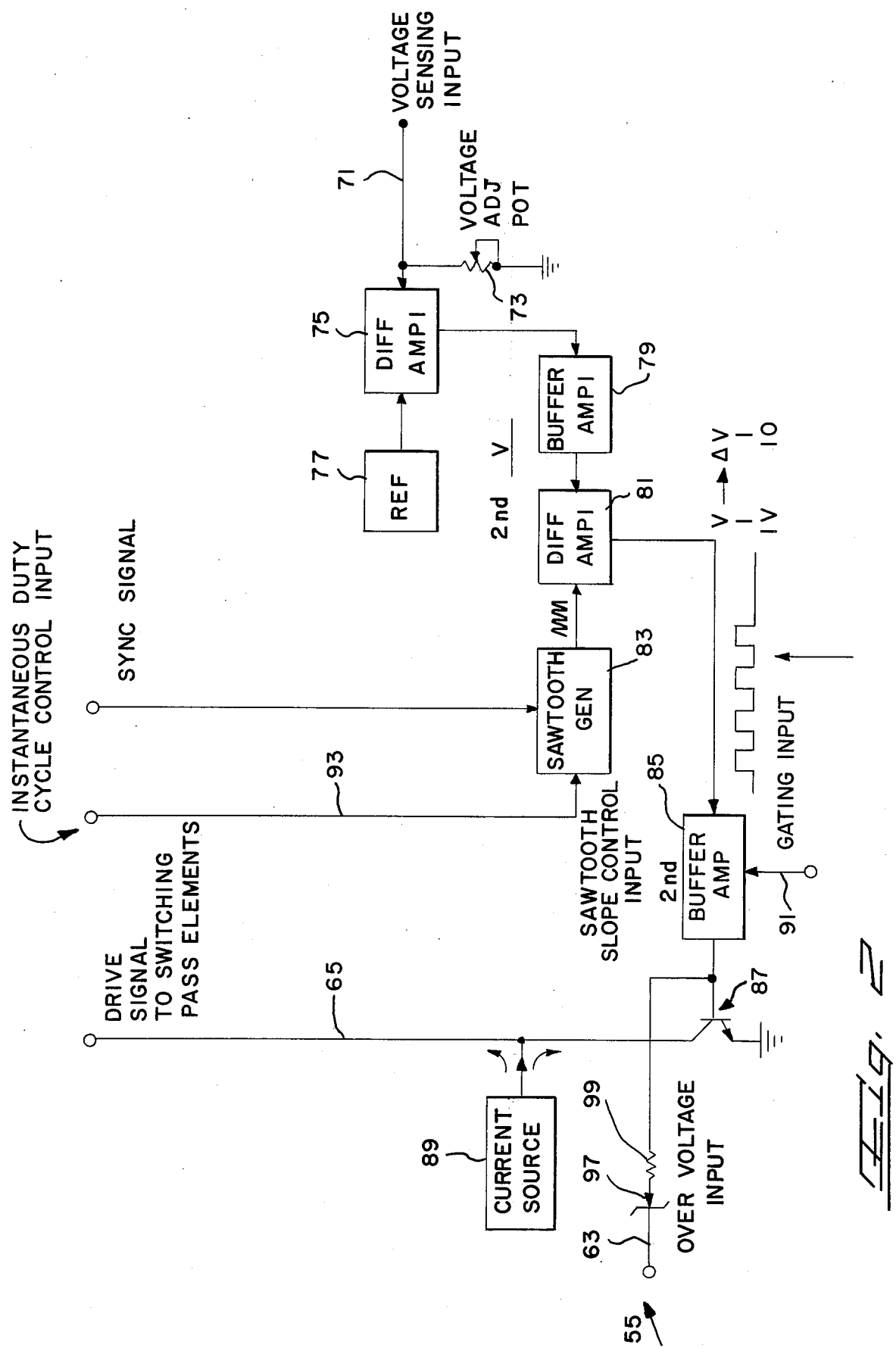

Referring now to FIG. 2, there is shown the duty cycle control circuit 11. The output voltage sensing input 71 goes through a resistor 73 to ground and the voltage applied across that resistor is proportional to the output voltage. There is a connection to a differential amplifier 75 which draws essentially no current. Since no current is being drawn, the voltage at the voltage adjustment pot 73 is proportional to the output voltage. The differential amplifier 75 compares that voltage to a reference voltage 77 and, if it is high or low, a signal is provided by a differential amplifier 75 to a buffer amplifier 79 and provides much wider swings than are provided by the output of the differential amplifier. The buffer amplifier 79 provides a signal to one side of a second differential amplifier 81. A saw tooth generator 83 provides a signal to the other side of the second differential amplifier 81. When the voltage from the saw tooth input 83 to the second differential amplifier 81 equals the voltage from the buffer amplifier 79, the differential amplifier 81 will start to provide a signal and continue to provide the output until the saw tooth goes back below the voltage from the buffer amplifier 79. The difference in voltage from the second differential amplifier 81 is a low voltage when the saw tooth is the same or less than the output of the buffer amplifier and greater at other times this providing a rectangular wave output, having some duty cycle. This duty cycle will change depending on the voltage output of buffer amplifier 79. The output of the second differential amplifier 81 is amplified in a second buffer amplifier 85, this signal to the second buffer amplifier having the same duty cycle as above. The sawtooth generator 83 is synchronized to a same frequency as the parallel series converter 21 as well as master oscillator 47. As the output voltage on line 71 goes a little high, the voltage being applied to the second differential amplifier 81 will be significantly lower, and the duty cycle will decrease to make the output come back down.

The output from the second buffer amplifier 85 goes to a transistor 87 which is used merely as a switch that is full on or full off. When the transistor 87 is turned off the current source 89 provides drive 65 to the switching pass elements 17 and turns them on. When the transistor 87 is turned on all the current from the current source is diverted to ground and the switching pass elements are turned off.

Figure 1B:
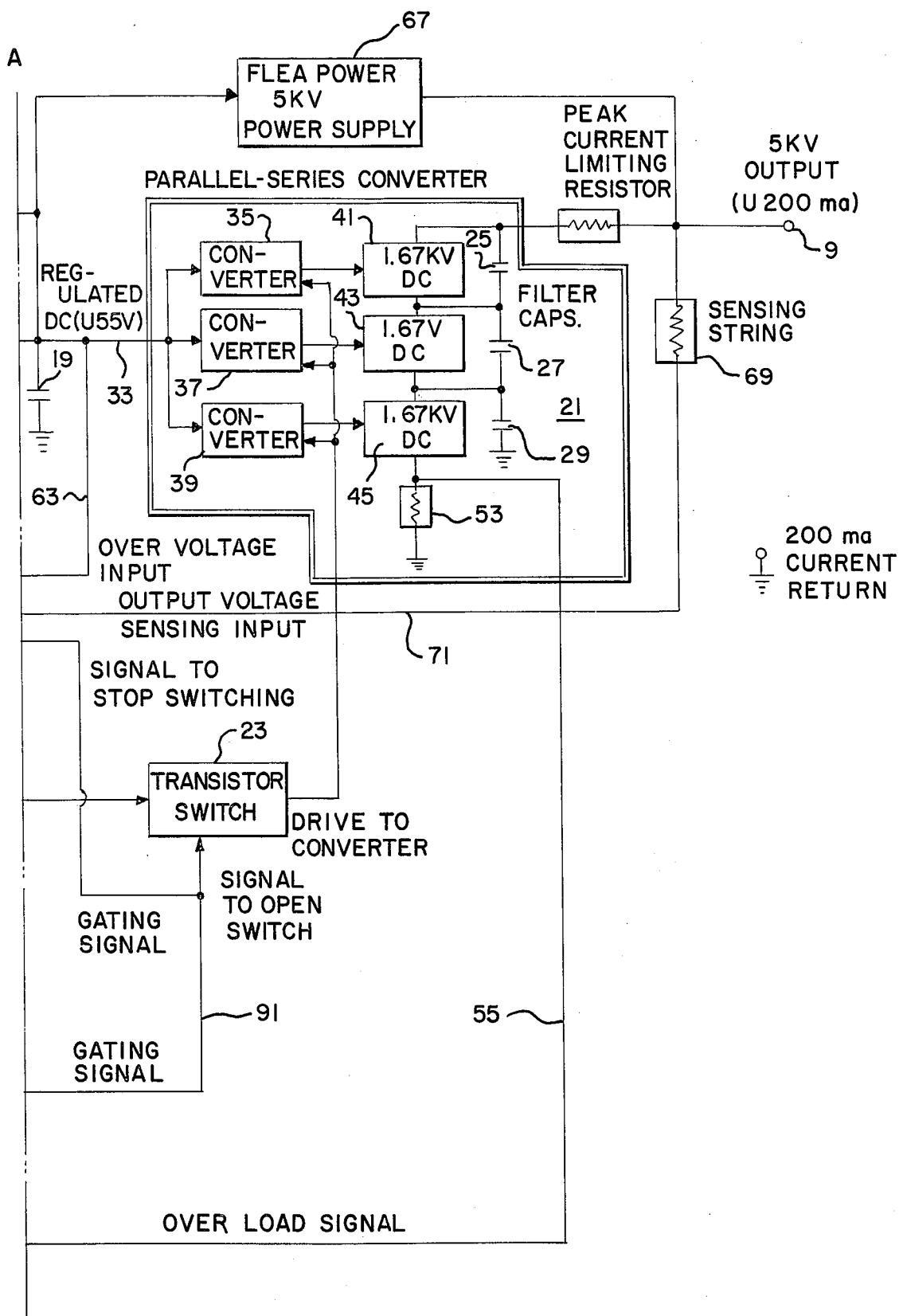

The second buffer amplifier 85 has a gating input 91 which comes from the blank input 31 of FIG. 1. This is a signal to stop switching during blank period or over load shut down.

The instantaneous duty cycle control input 93 is a further unique supply feature of the power supply. For stability reasons, the duty cycle control circuit has slow response time when reacting to changes in the 5 kv output. Therefore fluctuations in the raw DC input will be fed directly to the 5 kv output and cause unwanted modulation. The instantaneous duty cycle control feature overcomes this. If the raw DC input 95 jumps up suddenly by some value, the slope of the sawtooth will change by about the same percentage and provide an instantaneous change in a duty cycle to cause the output to come down by that percentage. The instantaneous control is provided because in a duty cycle control circuit of this type, there are very large gains and it is therefore necessary to have very slow response times to prevent oscillation and be stable. Due to the slow response times a sudden change in the input voltage will cause a great deal of time to be required to cause a change to normal operation. The instantaneous duty cycle control circuit provides a substantially instantaneous change. Therefore, this leads to a simultaneously tracking and sensing of the output voltage as well as the input voltage to provide the control. The close regulation comes from the signal from the output. The instantaneous duty cycle control circuit merely provides an extra off set and operates rapidly rather than slowly as would be the case with the output control. The instantaneous duty cycle control circuit therefore provides an essential filtering at the input since it prevents problems due to ripple and the like by sensing these changes.

The over voltage input 63 passes through zener diode 97 and a resistor 99 wherein, if too high of a voltage is provided, the zener diode breaks down and turns on transistor 87, thereby turning off the switching pass elements 17.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A power supply comprising an input source of unregulated D.C. voltage,
    means coupling the input source to an output including,
    switching means between the input source and the output,
    a source of regularly recurrent pulses,
    means responsive to said pulses for rendering the switching means operative to connect the input source to the output for a time depending on the width of each pulse,
    said source of regularly recurrent pulses being jointly responsive to the instantaneous voltage amplitude of the input source and the voltage amplitude at the output for adjusting the width of the pulses for regulating the output voltage,
    wherein the source of regularly recurrent pulses includes a sawtooth waveform generator with the slope of the waves dependent on the instantaneous voltage of the input,
    means for sensing the voltage at the output,
    means for providing an error voltage having an amplitude dependent upon variations from a predetermined voltage at the output,
    and means for comparing the sawtooth waves with the error voltage to produce said regularly recurrent pulses,
    wherein the means coupling the input source to the output comprises a plurality of driven voltage converters with their inputs connected in parallel to the switching means and their outputs connected in series voltage adding relation,
    a source of oscillations,
    and means controlled by said source of oscillations for driving said converters in synchronism.

2. A power supply according to claim 1 including means for synchronizing the sawtooth waveform generator with the source of oscillations.

3. A power supply according to claim 2, including means responsive to a voltage greater than a predetermined amplitude applied to the converter means for rendering said switching means inoperative.

4. A power supply according to claim 1, including means responsive to a voltage greater than a predetermined amplitude applied to the converter means for rendering said switching inoperative.

5. A power supply comprising an input source of unregulated D.C. voltage,
    means coupling the input source to a load having an output including,
    switching means between the input source and the output,
    a source of regularly recurrent pulses,
    means responsive to said pulses for rendering the switching means operative to connect the input source to the output for a time depending on the width of each pulse,
    said source of regularly recurrent pulses being jointly responsive to the instantaneous voltage amplitude of the input source and the voltage amplitude at the output for adjusting the width of the pulses for regulating the output voltage, the means coupling the input source to the output comprises a plurality of driven voltage converters with their inputs connected in parallel to the switching means and their outputs connected in series voltage adding relation,
    a source of oscillations,
    and means controlled by said source of oscillations for driving said converters in synchronism.

6. A power supply according to claim 5 including means responsive to a voltage greater than a predetermined amplitude applied to the converter means for rendering said switching means inoperative.

* * * * *